United States Patent
Giambiagi et al.

(10) Patent No.: US 9,401,930 B2
(45) Date of Patent: Jul. 26, 2016

(54) SYSTEM AND METHOD FOR USING PARTIAL EVALUATION FOR EFFICIENT REMOTE ATTRIBUTE RETRIEVAL

(71) Applicant: AXIOMATICS AB, Stockholm (SE)

(72) Inventors: Pablo Giambiagi, Stockholm (SE); Erik Rissanen, Stockholm (SE)

(73) Assignee: AXIOMATICS AB, Stockholm (SE)

( * ) Notice: Subject to any disclaimer, the term of this patent is extended or adjusted under 35 U.S.C. 154(b) by 231 days.

(21) Appl. No.: 13/932,734

(22) Filed: Jul. 1, 2013

(65) Prior Publication Data

US 2013/0291059 A1 Oct. 31, 2013

Related U.S. Application Data

(63) Continuation-in-part of application No. PCT/SE2011/050922, filed on Jul. 7, 2011.

(60) Provisional application No. 61/435,046, filed on Jan. 21, 2011.

(30) Foreign Application Priority Data

Dec. 30, 2010 (SE) ...................................... 1051395

(51) Int. Cl.
*G06F 17/00* (2006.01)
*H04L 29/06* (2006.01)
(Continued)

(52) U.S. Cl.
CPC .............. *H04L 63/20* (2013.01); *G06F 21/604* (2013.01); *G06F 21/6218* (2013.01); *H04L 63/10* (2013.01)

(58) Field of Classification Search
CPC .............. H04L 63/10–63/108; H04L 12/2461; H04L 41/28; G06F 21/6218
See application file for complete search history.

(56) References Cited

U.S. PATENT DOCUMENTS

| 7,653,930 B2 * | 1/2010 | Griffin ................ G06F 21/6218 726/1 |
| 7,673,323 B1 | 3/2010 | Moriconi |

(Continued)

FOREIGN PATENT DOCUMENTS

| WO | WO 2010/128926 A1 | 11/2010 |
| WO | WO 2010128926 A1 * | 11/2010 .......... G06F 21/6218 |

OTHER PUBLICATIONS

Rissanen et al., Declaration of Sales Activity, Aug. 19, 2013, 1 page.
(Continued)

*Primary Examiner* — Daniel Potratz
(74) *Attorney, Agent, or Firm* — Buchanan Ingersoll & Rooney P.C.

(57) ABSTRACT

An attribute-based policy defining subjects' access to resources is enforced by a computer system. A processing means (PDP) in the system communicates with a nearby attribute value source and at least one remote attribute value source and is adapted to evaluate the policy for an access request containing one or more explicit attribute values, which together with the policy define at least one implicit reference to a further attribute value, which is retrievable from one of said attribute value sources. The processing means reduces the policy by substituting attribute values for attributes in the policy if they are contained in the request or retrievable from the nearby source. References to further attributes retrievable from a remote source only are cached together with intermediate results. All attribute values from a given remote source are retrieved on one occasion, and the intermediate results are used to terminate the evaluation.

15 Claims, 3 Drawing Sheets

(51) Int. Cl.
*G06F 21/60* (2013.01)
*G06F 21/62* (2013.01)

(56) References Cited

U.S. PATENT DOCUMENTS

| | | | |
|---|---|---|---|
| 8,677,453 B2* | 3/2014 | Chang | G06F 21/6218 707/764 |
| 2005/0038783 A1 | 2/2005 | Lei et al. | |
| 2008/0209047 A1 | 8/2008 | Beigi et al. | |
| 2009/0164469 A1 | 6/2009 | Becker et al. | |
| 2009/0249440 A1* | 10/2009 | Platt | H04L 63/0815 726/1 |
| 2010/0042973 A1 | 2/2010 | Anderson et al. | |
| 2010/0107213 A1 | 4/2010 | Ureche et al. | |
| 2010/0325692 A1 | 12/2010 | Rissanen | |
| 2012/0066739 A1 | 3/2012 | Rissanen | |

OTHER PUBLICATIONS

International Search Report (PCT/ISA/210) issued on Dec. 6, 2011, by the European Patent Office as the International Searching Authority for International Application No. PCT/SE2011/050922.
Written Opinion (PCT/ISA/237) issued on Dec. 6, 2011, by the European Patent Office as the International Searching Authority for International Application No. PCT/SE2011/050922.
International Preliminary Report on Patentability (PCT/IPEA/409) issued on Apr. 11, 2013, by the European Patent Office as the International Searching Authority for International Application No. PCT/SE2011/050922.
Search Report issued in Swedish Application SE-1051395-0 on Dec. 30, 2010 (with English-language translation), 9 pages.
Office Action issued in Swedish Application SE-1051395-0 on Jul. 14, 2011, 4 pages.

* cited by examiner

SYSTEM AND METHOD FOR USING PARTIAL EVALUATION FOR EFFICIENT REMOTE ATTRIBUTE RETRIEVAL

CROSS REFERENCE TO RELATED APPLICATIONS

The present application is a (by-pass) continuation of International Application No. PCT/SE2011/050922, filed on 7 Jul. 2011, which claims the benefit of Swedish Application No. 1051395-0-5, filed on 30 Dec. 2010, and which claims the benefit of U.S. Provisional Application No. 61/435,046, filed on 21 Jan. 2011. The entire contents of each of International Application No. PCT/SE2011/050922, Swedish Application No. 1051395-0-5, and U.S. Provisional Application No. 61/435,046 are hereby incorporated herein by reference in their entirety.

FIELD OF THE INVENTION

The invention disclosed herein generally relates to the field of access control (AC), particularly access control to resources in computer systems or computer-aided access control to other types of resources. More precisely, the invention provides improved devices and methods for evaluating an AC policy that depends on attributes retrieved from a remote source.

BACKGROUND OF THE INVENTION

An attribute-based AC (ABAC) policy defines access control permissions based on the attributes of the subject, of the resource, and of the action that the subject is to perform on the resource (e.g., read, write). When the policy is enforced in a computer system or computer network, it controls access to entities in the system or network and thereby influences their state of operation. A resource may be, inter alia, a portion of a personal storage quota, a business unit storage quota, an information retrieval system, a (portion of a) database, an online service, a protected webpage or a physical device.

There currently exist general-purpose AC languages that have the richness to express fine-grained conditions and conditions which depend on external data. One particular example of an AC language is the eXtensible Access Control Markup Language (XACML) which is the subject of standardization work in a Technical Committee within the Organization for the Advancement of Structured Information Standards (see www.oasis-open.org). A policy encoded with XACML consists of functional expressions in attribute values, and the return value (decision) of the policy is one of Permit, Deny, Not Applicable, or Indeterminate. An XACML policy can apply to many different situations, that is, different subjects, resources, actions and environments and may give different results for different combinations of these. The XACML specification defines how a policy is evaluated for a request (or access request), particularly what policy attributes are to be evaluated or, at least, which values are required to exist for a successful evaluation to result. Key characteristics of this evaluation process are that the access request (the query against the policy) must describe the attempted access to a protected resource fully. In practice, it may be that the request is constructed in multiple stages by different components, so that a PEP (Policy Enforcement Point) provides only some initial attribute values and a PDP (Policy Decision Point) or other components can dynamically fetch more attribute values from remote sources as they are needed. For consistency reasons, the attribute values must not be retrieved earlier than the request is made. Rules in an ABAC policy may be nested in a conditional fashion, so that attribute values—both those provided initially in the access request and those fetched from remote sources—will influence what further rules are to be applied. Based on a policy or policy set (unless otherwise indicated, these terms are used interchangeably herein) that covers a broad range of resources and subjects and a given request, it is often possible to obtain a decision by evaluating only a fraction of all functional expressions in the policy. Conversely, it cannot always be ascertained prima facie whether a request contains enough attribute values to allow a successful policy evaluation.

To illustrate, a simple enterprise policy governs use of company printers and company documents (resources). For printers, the printer location is a remote attribute available in a directory. For documents, document classification, type, stage and author are remote attributes available in a database. For users (subjects), their clearance, office location, and nationality are remote attributes available in a directory. The policy (cf. FIG. 2) grants a user access to printers if his or her office is in the same location as the printer. For documents, access is allowed if the user has the same or higher clearance as the document classification, except for document on the "draft" stage, which may be accessed by the author only. Furthermore, if the document type is "military", then only users of domestic nationality may see the document. When the PDP receives a request about a document, there is no point in looking up attributes about the printer, and conversely, if the request is about a printer, then attributes relating to the document or the user can be ignored.

For this and similar reasons, even if a large portion of the attributes are to be fetched from a remote source with a long response time, a strategy where all attributes appearing in the policy are evaluated initially is generally less efficient than a leftmost-outermost strategy where the attributes are evaluated only when needed, by a series of lookup calls. Neither of these strategies scales well with the policy size or its degree of nesting.

SUMMARY OF THE INVENTION

In view of the shortcomings of the prior art, an improved technique for evaluating access requests to an ABAC policy is needed, according to which communication with any remote attribute value source is performed in an economical manner. Particular objects of the invention are the ability to process multiple-resource requests and to cooperate with a plurality of remote attribute value sources.

Accordingly, the invention provides methods and devices as set forth in the independent claims. The dependent claims define advantageous embodiments of the invention.

In a first aspect, a method is performed at a processing means (or PDP), which is operable to communicate with a relatively closer and a relatively more distant storage means (attribute value sources), from which attribute values can be retrieved, and possibly with further entities. As used herein, closeness between two network entities refers not primarily to geographic distance but to network distance, e.g., as suggested by the number of intermediate switches, routers etc. or as a measured response time or round-trip time. The method evaluates an ABAC policy for an access request with the aim of returning a decision. The ABAC policy may be stored in the PDP or may be available from an external source, as may be advantageous in situations where the policy is frequently updated. As already mentioned, the request may contain explicit attribute values that together with the policy define an implicit reference to a further attribute value (e.g., the evaluation of the policy requires that the printer location be looked up while using the printer ID provided in the request as a key). It is noted that an explicit attribute value need not be the value itself but can also be provided as a pointer to a memory location where the value is stored. In contrast hereto, an implicit reference afforded by the policy and the explicit attribute values in the request is preferably of a semantic nature, specifying what the information refers to (e.g., the unknown location of the requested printer, the ID number of which is known from the request) but not what this value is or where it is stored.

According to the invention, the method comprises a step of reducing the policy by substituting attribute values for attributes in the policy. The attribute values thus substituted are obtained in the access request or fetched from non-remote attribute value sources. The step of reducing may further comprise excluding certain functional expressions in the policy from evaluation since they are not applicable according to the logical structure of the policy (e.g., the document-specific condition on the user's nationality is not evaluated if the request is made in respect of a printer, and thus, no value need be substituted for the attribute indicating the user's nationality). During the reduction step, implicit references to further attribute values are being worked out by combining policy data with request data, and if the further attributes can be retrieved from remote sources only, references to these are cached. In addition to the implicit references themselves, the method may also cache additional data indicating the identity of the remote source from which the values are retrievable or the identity of an intermediate module adapted to retrieve the attribute values. The method may store the references to attribute values in parallel with the reduction process but may also store the references on one single occasion.

The method then reaches a point at which the reduction step is considered completed. This may be when the policy has been reduced as far as possible given the data in the request. This point may also occur at a predefined or arbitrary point in time, at which the reduction process has proceeded for sufficient time that it is deemed to no longer reduce the total execution time and it is deemed more economical to initiate the subsequent steps. After the completion of the reduction, the reduced policy is cached and forms a simplified policy. Since the simplified policy can be represented as a smaller set of processing instructions (code), it is in general more economical to evaluate.

As far as the XACML context is concerned, it is noted that the simplified policy may be represented in the same form as the original policy. However, the simplified policy may in some cases require a richer representation than standard XACML, possibly including a number of new quasi-error states stemming from the fact that some attributes have not yet been evaluated (substituted). For instance, a situation may arise in which a rule cannot be evaluated for lack of target or lack of values assumed by the attributes appearing in a condition in the rule. The simplified policy may then contain an indication that the rule is indeterminate, that is, temporarily overriding the standard evaluation rules, which may specify for this situation that an evaluation error is to be signaled. This is useful since it may turn out, when combining algorithms in the policy are applied, that the sub-tree in which this rule is located is inconsequential to the policy evaluation, so that this sub-tree may be eliminated from the simplified policy. It is noted that if the simplified policy is not represented in standard XACML, evaluation engines adapted for standard XACML may need to be modified to evaluate a simplified policy.

(The concept of a simplified policy and the technique of partial evaluation have been described in more detail in the applicant's earlier applications. Using the terminology of these earlier applications, the initial request may be regarded as a partial request, and the step of reducing may be regarded as a partial evaluation of the policy.)

The method then goes on to retrieve the attribute values from the remote attribute value source or sources, as specified by the cached references. Preferably, only one call is made to each attribute value source. By submitting all attribute value requests as one call, the lookup overhead is reduced since the impact of latency is decreased. Even if a multiple-value request cannot be submitted to the remote attribute value source, a similar advantage may be obtained by making all calls in a contiguous or near-contiguous manner (e.g., submitting the next call before receiving a response for the previous one), so that the latency periods elapse in parallel rather than adding to one another.

When the attribute values have been retrieved, the cached simplified policy is evaluated and a decision is obtained.

The invention achieves at least some of its objects since it is able to determine, based on an access request, the set of attribute values to be retrieved from one or more remote attribute value sources. This means that the number of calls to remote sources can be reduced, and the calls can be localized to a limited number of occasions so as to reduce the effect of latency. Since this determination is implemented efficiently by use of partial evaluation and since the intermediate results are recovered in the form of a simplified policy, embodiments of the invention may process an access request faster than currently available methods. Furthermore, the invention is able to handle frequent updates of the policy and/or the attribute values.

In a second aspect, the invention provides a processing means (e.g., a PDP) for evaluating an ABAC policy for an access request, which processing means comprises a partial evaluation module, first and second memories and an evaluation module. The partial evaluation module and the evaluation module are configured to operate in a time-disjoint manner, so that, for a given access request to be processed, the evaluation module does not initiate the retrieval of attribute values from the remote attribute value source until the partial evaluation module has completed its reduction of the policy. Similarly, in the case of a multiple-resource request, which may be partitioned into single-resource requests, the evaluation module does not retrieve the attribute values until the reduction of the policy has been completed for all the resources to which the request refers or, possibly, until the reduction has been completed for all of said single-resource requests.

In a third aspect, the invention provides a computer-program product for causing a computer to perform a method according to the first aspect. These further aspects of the invention share the advantages of the first aspect and can be adapted and further developed similarly to the embodiments within the first aspect.

It has been noted that a policy and an explicit attribute value in the request may jointly define an implicit reference to an attribute value. The invention is equally applicable to the case where a further attribute value is required in order for this implicit reference to become complete. For instance, the policy may refer to a risk level of a subject, which is a function of the nationality of the subject, in that the same risk level is assigned to all individuals with the same nationality. To facilitate updates, the risk levels are available from a data record which is separate from the record of nationalities. When the implicit reference to the risk level is being worked out, the PDP first uses the subject's identity as a key for finding the subject's nationality, and then uses the subject's nationality to find the applicable risk level. In a concrete situation, each of the two values of attributes nationality and risk level may be retrievable from a nearby attribute source, a first remote source (with which a first attribute finder module communicates) or a second remote source (with which a second attribute finder module communicates). If the attribute values are to be retrieved from different sources, the reference may not be well-defined until one of these has been contacted. In particular, it may happen that two attribute finder modules are required to cooperate by exchanging an attribute value between each other or the like. This may in some situations impose a necessary order arising from the structure of the policy and the locations where the attribute values are stored. Referring back to the example, the retrieval of the risk level value cannot happen before the value of the nationality attribute is known. If the two values are retrieved by different attribute finder modules, the first one preferably sends the nationality value to the second, which may proceed through an intermediary device, such as the PDP.

The policy may contain nested functional expressions. Advantageously, the step of reducing includes substituting the explicit attribute values from the request (and possibly, substituting attribute values retrieved from the nearby attribute source as well) for attributes appearing in a first functional expression in order to conclude whether a second, different functional expression, which is nested inside the first expression, is applicable. For example, the explicit attribute values in the access request may indicate that the resource is a printer, which implies that functional expressions targeting documents are not applicable and can be excluded from evaluation. Hence, these expressions need not form part of the cached simplified policy.

Preferably though not necessarily, the reduction of the policy is carried out in a parallel fashion, wherein the logic-functional structure of the policy is evaluated by a partial evaluation module and the attribute-value retrieval is carried out by an attribute finder module, which is independent of the partial evaluation module in the sense that it executes on a separate processor, executes as a separate thread in the same processor or otherwise uses its own, separate quota of processor time and/or other performance-critical resource.

The work sharing between the two modules may consist in that the partial evaluation module communicates with the attribute finder module in order to receive information as to whether an attribute appearing in the policy is retrievable from a remote attribute value source only. Since this task is independent of those for which the partial evaluation module is responsible, the task involved in policy evaluation execute to some extent in parallel.

The work sharing between the two modules may alternatively consist in that the partial evaluation module requests an attribute value to be substituted for an attribute appearing in the policy from an attribute finder module. The partial evaluation module may also submit one request for an attribute value to several attribute finder modules. The attribute finder module(s) having received the request may either communicate with a nearby attribute value source, obtain the requested attribute value and return this to the partial evaluation module, or may return an indication that a requested attribute value is retrievable from a remote attribute value source only. The partial evaluation module may cache this indication until the reductions have been completed and it is time to retrieve the missing attribute values from the remote source(s). Optionally, if several attribute finder modules are deployed in the system, the indication may point out which of these is to be contacted in order to provide the attribute value.

The attribute finder module may also be configured to retrieve attribute values appearing in the simplified policy from the remote source(s). In a further development, the attribute finder module may also comprise a memory for caching the retrieved attribute values, from which they are available to the entity evaluating the simplified policy. For instance, if the simplified policy is evaluated by an evaluation module, the evaluation module may communicate the missing attribute values to the attribute finder module and then, after these have been retrieved and cached by the attribute finder module, requesting the attribute values as they are needed in the course of evaluation.

Optionally, the cache is not emptied after the evaluation of one access request has terminated, but the cached attribute values remain available for at least one subsequent request. Such extended caching may allow faster evaluation of the subsequent request. The cached values are deleted after a predetermined duration of time, as they may otherwise become non-authoritative when the remote attribute value source receives updates.

A multiple-resource access request refers is a format (also referred to as a context) for requesting a decision in respect of multiple resources, either in the form of a single decision or as a separate decision for each requested resource. This avoids sending multiple decisions between a PEP and PDP. Alternatively, a PEP may which to submit a single access request for all the nodes in a hierarchy. As one example, the document "Multiple resource profile of XACML v2.0", retrievable from www.oasis-open.org, discusses an implementation of such multiple-resource requests. Preferably, the invention evaluates an ABAC policy for a multiple-resource request by generating single-resource access requests on the basis of the multiple-resource request. The policy is reduced for each of the single-resource requests, and a simplified policy is cached for each. The step of retrieving attribute values from the remote attribute value source(s) is preferably performed after all reductions have completed, that is once for all single-resource requests generated from the multiple-resource requests. Alternatively, if the invention is implemented in an entity capable of interpreting a multiple-resource request for one requested resource at a time directly, the reductions may take place without any single-resource request being generated. Still, the step of retrieving attribute values from the remote source(s) is preferably performed only once for one multiple-resource request and one remote source. If the attribute values needed for the evaluation of the respective generated single access requests overlap, this order of the steps contributes to decreasing the total amount of transmitted data.

It is noted that the invention relates to all combinations of features, even if these are recited in different claims.

BRIEF DESCRIPTION OF THE DRAWINGS

Embodiments of the invention will now be described with reference to the accompanying drawings on which.

DETAILED DESCRIPTION OF EMBODIMENTS

Figure 1:
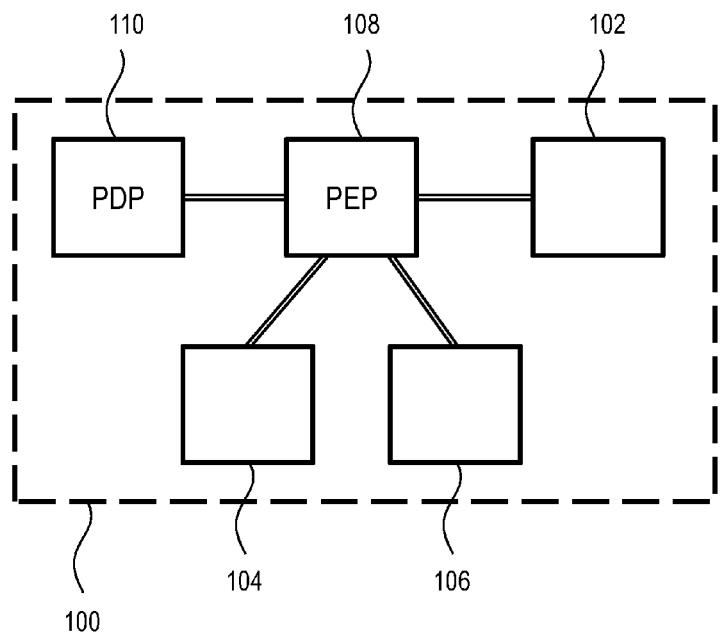
FIG. 1 illustrates an exemplifying AC policy architecture.

FIG. 1 is a generalized block diagram of the XACML architecture 100, although simplified, according to the prior art. As stated before, XACML is an access control policy language. An attempt to access a resource 102 is represented as a "Request", which lists attributes of the subject 104, the resource 102, the action and the environment 106. An attribute is an identifier, a data type and a value. It can also be described as a variable with a name (the identifier), a data type and a value. Most facts relating to the subject 104, the resource 102, the action and the environment 106 can be described in terms of attributes.

The request is constructed by a PEP 108. The purpose of a PEP 108 is to guard access to a resource 102 and only let authorized users through. The PEP 108 itself does not know who is authorized, but it submits the request to a PDP 110, which contain policies governing what requests are to be permitted or denied, respectively. The PDP 110 evaluates the policies and returns a permit/deny response to the PEP 108. The PEP 108 then either lets the access proceed or stops it. As already noted, the PEP (Policy Enforcement Point) may provide only some initial attribute values and the PDP (Policy Decision Point) or other components may dynamically fetch more values from remote sources as they are needed. If all necessary values cannot be retrieved, the policy evaluation may return an output to the effect that the policy is indeterminate or not applicable in the circumstances, or an error message.

A purpose of this architecture is to establish separation of concerns, that is, to differentiate between policy decision making and policy enforcement. Enforcement is by its nature specific to a particular resource 102, while a decision engine can be made general-purpose and reusable.

Figure 2:
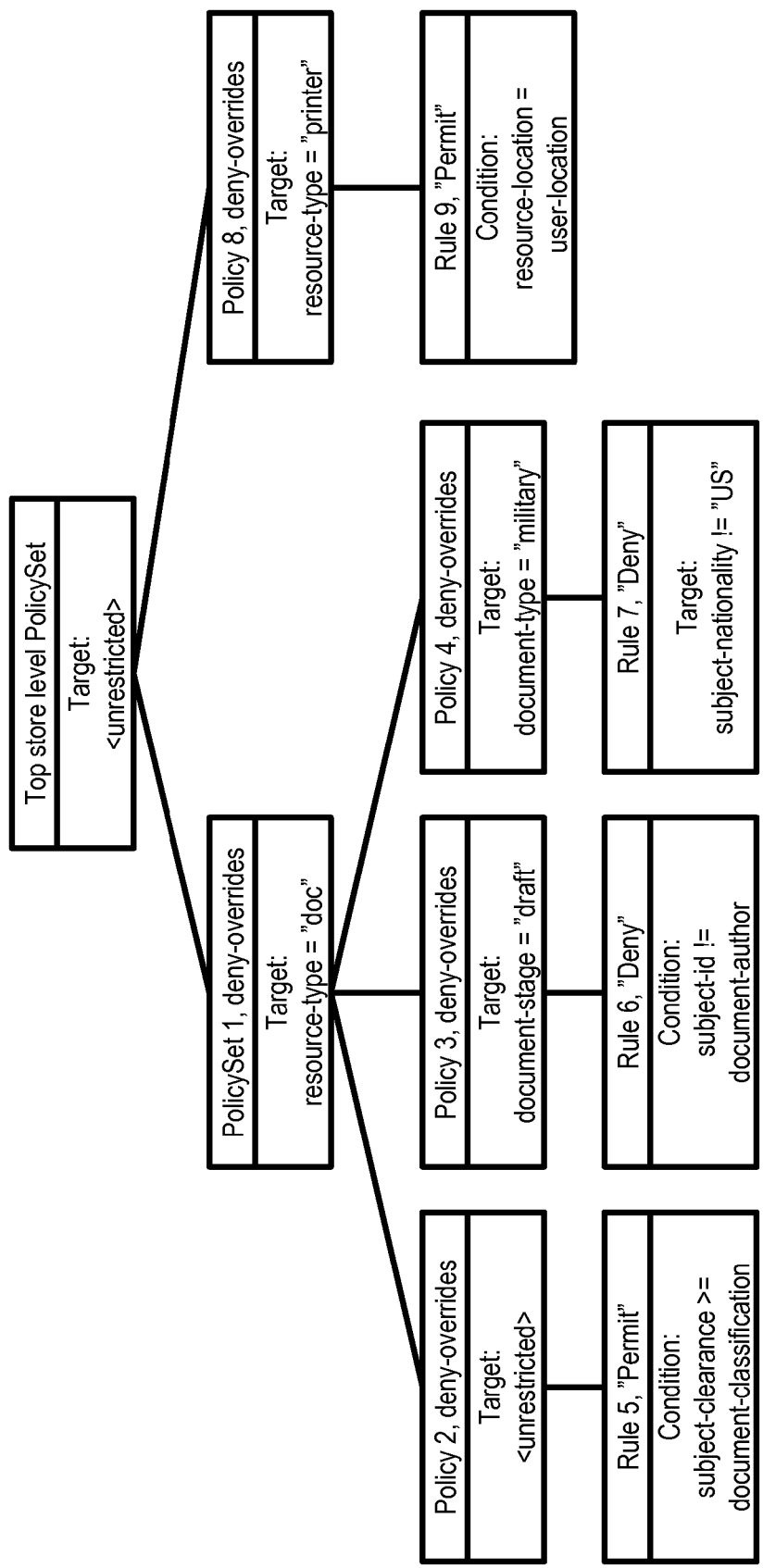
FIG. 2 is a tree representation of an ABAC policy set.

In general, policies can be nested to form a policy set, as may be visualized in a tree form of the type shown in FIG. 2. The combination of different policies is governed by combining algorithms, which define what policy takes precedence over another policy. The node "PolicySet 1" in FIG. 2 is of the "deny-overrides" type, so that a "Deny" decision from one of the three sub-trees will take precedence; hence, the "deny-overrides" operator acts as logical AND. In contrast, decisions produced by sub-trees which connect at a "permit-overrides" node are subject to logical OR.

At the lowest level of the tree shown in FIG. 2, there are rules including effects (e.g., "Deny") and underlying conditions formulated in terms of attributes, for instance, "subject-nationality !='US'", where "subject-nationality" is a subject attribute and "US" is a constant. At several nodes above the lowest level, there are conditions labeled "Target", which indicate the requests for which the sub-tree having its root at that node is applicable. For example, if the condition "document-stage='draft'" evaluates to "false", then Policy 3, including Rule 6, is not applicable and can be excluded from evaluation.

Figure 3:
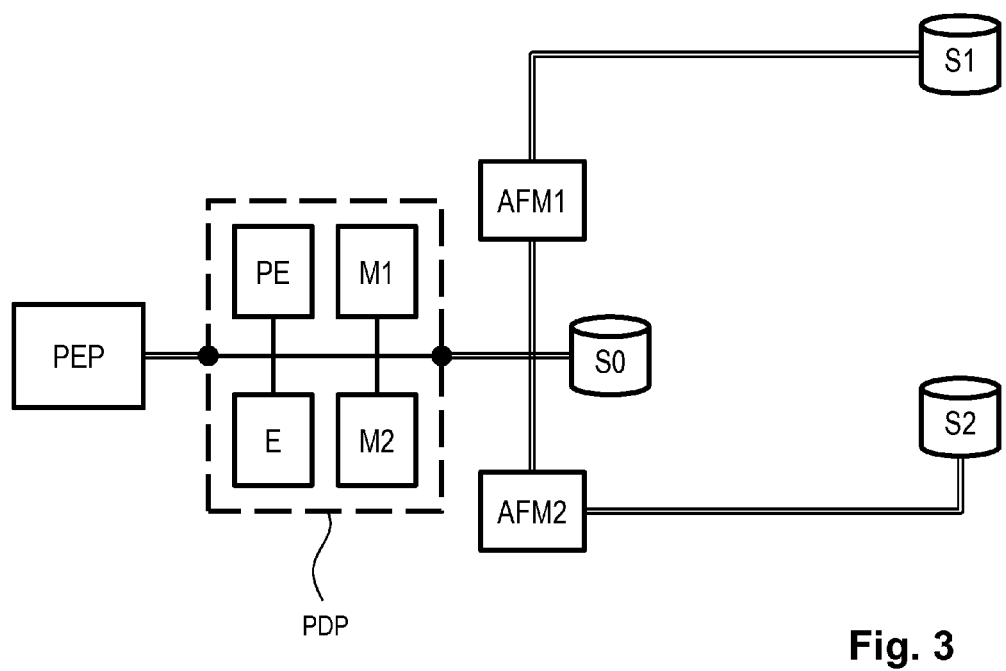
FIG. 3 is a generalized block diagram of a processing means for evaluating an ABAC policy for an access request.

FIG. 3 schematically illustrates a computer system in which the invention can be implemented. Single lines refer to internal data connections and double lines to network connections. A PEP communicates with a PDP containing a partial evaluation module PE, an evaluation module E, first and second memories M1, M2. The PDP is connected to a nearby attribute value source S0 and first and second attribute finder modules AFM1, AFM2, each connected to a respective remote attribute value source S1, S2. The functioning of these components is set forth in the appended claims and earlier in this disclosure. As the partial evaluation module PE and the evaluation module E are responsible for similar tasks, they may as well be embodied as a single unit. Further optionally, since the PDP may ignore whether a given attribute value is retrievable via the first and second attribute finder modules AFM1, AFM2 (or equivalently, from the first or second remote attribute value sources S1, S2), it may be configured to submit requests for attributes to both attribute finder modules and to handle two responses from these.

The cooperation of a PDP and an attribute finder module will be exemplified and discussed. In an object-oriented programming context, the attribute finder module may be implemented as a class for which the following functions (or methods) are defined:

cacheAttrsHint( ): void cacheRequestBegin( ): void cacheRequestEnd( ): void findAttribute( ): void Function cacheRequestBegin is invoked at the beginning of a request evaluation. At this stage, the custom attribute finder module is expected to prepare a cache record for the duration of the evaluation of a request (which may be intended to generate multiple decisions).

The PDP will then proceed with policy evaluation. findAttribute is invoked for attributes in expressions in the policy that are due to be evaluated. Depending on the nature of the attribute, the attribute module will respond differently:

In case of an attribute not recognized by the module, the AttributeFinderModule returns an empty result in these cases.

In case of an attribute recognized by the module, where the module can provide the attribute values cheaply (e.g., from a nearby attribute value source), the AttributeFinderModule returns the values.

In case of a remote attribute which is recognized by the module, the AttributeFinderModule returns a special return value, "needHint".

The PDP will proceed to evaluate the policy in this fashion. Based on the local attributes, typically large sections of the policy will fall out as non-applicable. Once the PDP has finished evaluation based on local (or cheaply available) attributes, it will call the cacheAttrsHint method of the attribute finder module. This method call will provide pairs of a request and a set of attributes that the policy needs. (There may be multiples of these pairs in case of an initial request for multiple decisions.) The module will retrieve these attributes from the remote sources by using values from the associated requests as keys, wherein the attributes required may be different for the individual requests. In this embodiment, the retrieved values are cached.

The PDP will then proceed with policy evaluation, asking for attributes, and the attribute finder module will now have all required remote attributes in its cache. Once policy evaluation is completed, the PDP will call the cacheRequestEnd function. At this stage the Attribute Finder Module may decide to expire the cache entry for this request.

As an example, it is now assumed that a request concerns a document and contains the following explicit attribute values:

| Category | Attribute | Value |
| --- | --- | --- |
| Subject | subject-id | alice |
| Resource | Resource-type | doc |
|  | resource-id | 12345 |
| Action | action-id | read |

In this case, PolicySet 1 will apply, and Policy 8 will not apply. The following communications between the PDP and the attribute finder module will take place:

| Function call to AFM | Response from AFM |
|---|---|
| cacheRequestBegin( ) | — |
| findAttribute(resource-type) | empty( ) |
| findAttribute(subject-clearance) | needHint( ) |
| findAttribute(document-classification) | needHint( ) |
| findAttribute(document-stage) | needHint( ) |
| findAttribute(subject-id) | empty( ) |
| findAttribute(document-author) | needHint( ) |
| findAttribute(document-type) | needHint( ) |
| findAttribute(subject-nationality) | needHint( ) |
| findAttribute(resource-type) | empty( ) |
| cacheAttrsHint( ) | — |
| findAttribute(subject-clearance) | subject-clearance = 10 |
| findAttribute(document-classification) | document-classification = military |
| findAttribute(document-stage) | document-stage = final |
| findAttribute(document-author) | document-author = bob |
| findAttribute(document-type) | document-type = report |
| findAttribute(subject-nationality) | subject-nationality = us |
| cacheRequestEnd( ) | — |

Clearly, the AFM returns empty( ) when a requested attribute value is available as part of the access request. After an attribute has been retrieved from the remote attribute value source, the value will be returned. After the invocation of cacheAttrsHint( ) the AFM retrieves the missing attribute values on the basis of the references cached during the reduction (partial evaluation) of the policy. For example, the attribute "document-stage" in Policy 3 is supplemented with the document ID (resource-id=12345) to form a definite reference. As already noted, this reference is semantic; it allows the AFM to submit a well-defined query for the attribute value to a remote attribute source but does typically not reveal its memory location.

Figure 4:
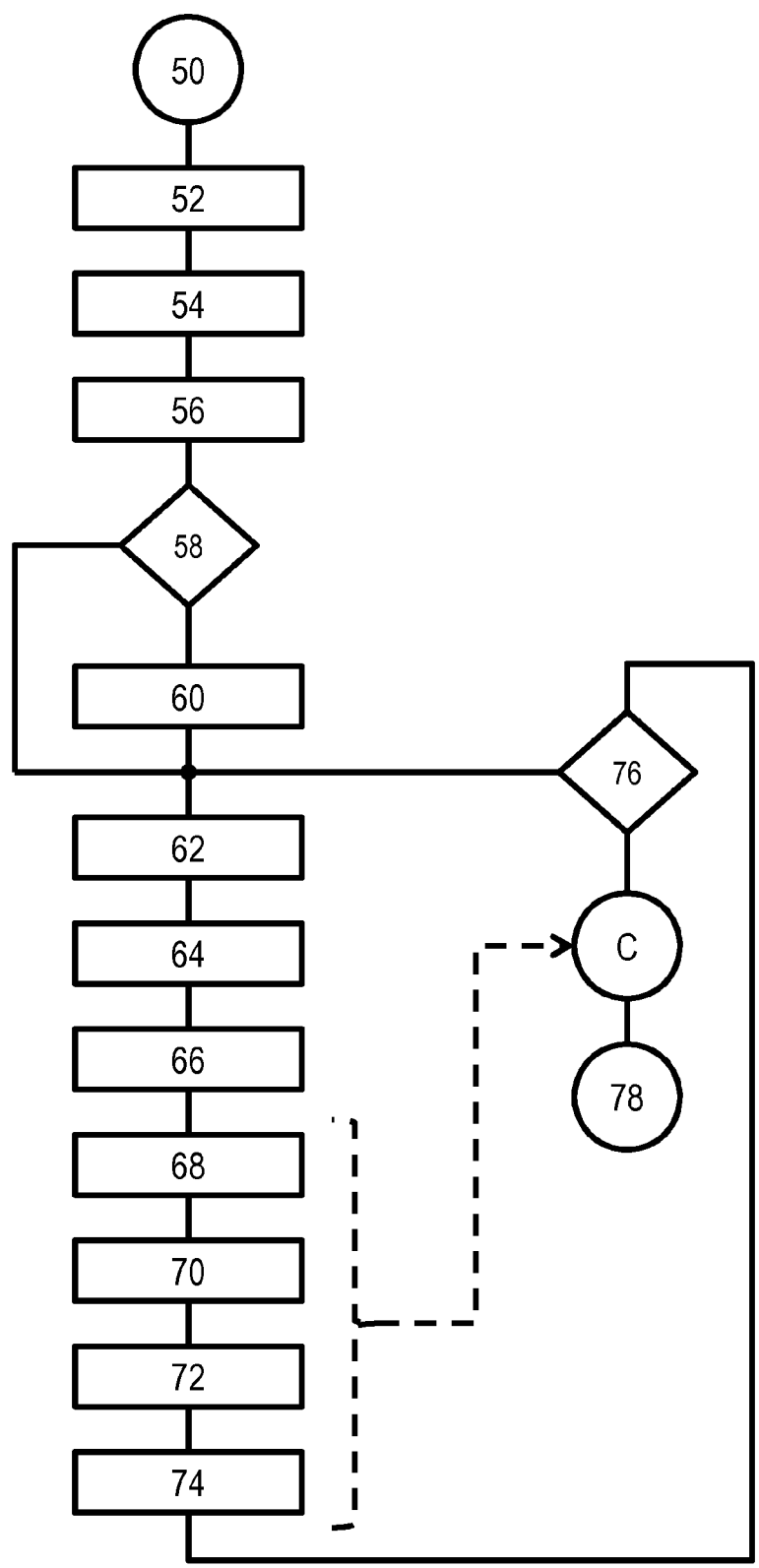
FIG. 4 is a flow chart of a method according to an embodiment of the invention.

In FIG. 4 there is disclosed a flow chart of a method for using partial evaluation for efficient remote attribute retrieval during authorization (or AC) policy evaluation in order to permit/deny access to a protected means according to the present invention. The method is performed with the aid of a processing means. The method begins at block 50. The method continues, at block 52, with the step: with the aid of a first storing means, comprised in the processing means, to store all policies for all protected means. Thereafter, the method continues, at block 54, with the step: with the aid of a guard means, comprised in the processing means, to construct an access request comprising attributes regarding the protected means. The method continues, at block 56, with the step: with the aid of a policy decision means, comprised in the processing means, to receive the access request from the guard means. Thereafter, the method continues, at block 58, by asking the question: Is the access request a multiple-resource access decision request? If the answer is affirmative, the method continues, at block 60, with the step: with the aid of the policy decision means, to generate a set of full individual access requests. The method continues, at block 62, with the step: for each individual access request, with the aid of the policy decision means, to evaluate the individual access request with partial evaluation resulting in a simplified policy. If the answer to the question asked in block 58 is negative, the method continues by performing the step according to block 62. Thereafter, the method continues, at block 64, with the step: with the aid of a second storing means, comprised in the processing means, to store the simplified policy together with the individual access request. The method continues, at block 66, with the step: with the aid of the simplified policies, to determine the minimal subset of remote attribute values required to evaluate the individual requests. Thereafter, the method continues, at block 68, with the step: with the aid of an attribute finder module, comprised in the processing means, to retrieve the minimal subset of remote attribute values from remote sources in parallel. The method continues, at block 70, with the step: with the aid of a third storing means, comprised in the processing means or the attribute finder module, to store the remote attribute values. Thereafter, the method continues, at block 72, with the step: for each individual access request, with the aid of the policy decision means, to perform evaluation making use of the simplified policy. The method continues, at block 74, with the step: to return a permit/deny response to the guard means. Thereafter, the method continues, at block 76, by asking the question: Is there any individual access request left? If the answer is affirmative, the method continues by performing the step according to block 62 again, as indicated in FIG. 4. If, on the other hand, the answer is negative, the method terminates at block 78.

Alternatively, as indicated by the broken arrow, the steps symbolized by blocks, 68, 70, 72 and 74 may be moved to the point indicated by "C". According to this alternative, the retrieval of remote attributes (block 68) is performed only once for a multiple-resource request.

In another embodiment, a computer system is operable to apply partial evaluation for efficient remote attribute retrieval during authorization (or AC) policy evaluation in order to permit/deny access to a protected means. The system comprises a first storing means operable to store all policies for all protected means, a guard means operable to guard access to a protected means, and to construct an access request comprising attributes regarding the protected means, a policy decision means operable to receive the access request from the guard means. The system also comprises a policy distribution means connected to the first storing means, and to the policy decision means. The policy decision means is also operable, if the access request is a multiple access decision request, to generate a set of full individual access requests, and for each individual access request, the policy decision means is operable to evaluate the individual access request with partial evaluation resulting in a simplified policy, which together with the individual access request are stored in a second storing means, comprised in the system. The policy decision means is also operable to, with the aid of the simplified policies, determine the minimal subset of remote attribute values required to evaluate the individual requests. The system also comprises an attribute finder module operable to retrieve the minimal subset of remote attribute values from remote sources in parallel, which remote attribute values are stored in a third storing means, comprised in the system. Furthermore, the policy decision means is also operable to, for each individual access request, perform evaluation making use of the simplified policy, and to return a permit/deny response to the guard means.

The main advantage associated with this system is that it performs well even if remote attribute retrieval is used. Calls to remote attribute sources are made only once per attribute source, leading to a decrease in the remote call overhead.

Further embodiments of the present invention will become apparent to a person skilled in the art after studying the description above. Even though the present description and drawings disclose embodiments and examples, the invention is not restricted to these specific examples. For instance, the invention can be applied to control access to resources outside the context of computing; as an example, access to the premises in a building can be controlled if suitable identification means (e.g., card readers, biometric sensors, which identify a person as a subject in a guarding system) and actuators (e.g., electrically controllable door locks) are provided and are communicatively connected to a computer system for enforcing the AC policy. Numerous modifications and variations can be made without departing from the scope of the present invention, which is defined by the accompanying claims. Any reference signs appearing in the claims are not to be understood as limiting their scope.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Also, a computer-implemented method of constructing a simplified ABAC policy equivalent to a full ABAC policy, comprising:

inputting a full ABAC policy comprising a plurality of attribute-dependent expressions, wherein each expression is evaluable to one of Not applicable, Indeterminate and either Permit or Deny;

inputting a partial request comprising at least one attribute value and at least one attribute identified as variable;

partially evaluating said full ABAC policy by substituting said at least one attribute value for a corresponding attribute appearing in the policy, and forming, based on the evaluation result thus obtained and predetermined simplification rules, a simplified ABAC policy equivalent to the full ABAC policy; and outputting said simplified ABAC policy, wherein said simplified ABAC policy comprises an expression having a result data field for storing said evaluation result.

The invention claimed is:

1. A method of evaluating an attribute-based access control (ABAC) policy, for an access request, wherein:

the method is implemented at a processing means communicatively connected to a nearby attribute value source and at least one remote attribute value source; and the access request contains one or more explicit attribute values, which together with the ABAC policy define at least one implicit reference to a further attribute value, which is retrievable from one of said attribute value sources, the method comprising the steps of:

reducing the ABAC policy at least by substituting said one or more explicit attribute values for corresponding attributes appearing in the policy and by substituting further attribute values, to which the access request and the policy make implicit reference and which are retrievable from the nearby attribute value source;

caching references to further attributes to which the access request and the simplified policy make implicit reference and which are retrievable from a remote attribute value source only;

after completion of said reducing, caching the policy as a simplified policy;

retrieving attribute values from the at least one remote attribute value source based on the cached references; and evaluating the cached simplified policy by substituting the retrieved attribute values.

2. The method of claim 1, wherein the ABAC policy contains conditionally nested functional expressions and the step of reducing comprises:

excluding, based on said one or more explicit attribute values, at least one functional expression from evaluation as non-applicable.

3. The method of claim 1, wherein the step of reducing comprises:

communicating with an attribute finder module to determine whether an attribute appearing in the policy is retrievable from a remote attribute value source only.

4. The method of claim 1, wherein the step of reducing comprises requesting an attribute value to be substituted for an attribute appearing in the policy from an attribute finder module.

5. The method of claim 4, wherein the step of caching a reference to further attributes comprises receiving an indication from the attribute finder module that a requested attribute value is retrievable from a remote attribute value source only and caching this indication.

6. The method of claim 5, wherein the step of retrieving attribute values from the at least one remote attribute value source comprises transmitting the cached indication to the attribute finder module and obtaining the requested attribute value from the attribute finder module.

7. The method of claim 4, wherein the step of reducing comprises requesting an attribute value to be substituted for an attribute appearing in the policy from a plurality of attribute finder modules.

8. The method of claim 1, wherein the access request is a multiple-resource access request, said method further comprising the initial step of generating single-resource access requests on the basis of the multiple-resource access request, wherein:

the steps of reducing, caching references to further attributes and caching a simplified policy are performed once for each of the single-resource requests; and the step of retrieving attribute values from the at least one remote attribute value source is performed once for all single-resource requests.

9. A computer-program product comprising a non-transitory data carrier for storing computer-readable instructions for performing the method of claim 1.

10. A processing means, communicatively connected to a nearby attribute value source and at least one remote attribute value source and being adapted to evaluate an attribute-based access control (ABAC) policy, for an access request containing one or more explicit attribute values, which together with the ABAC policy define at least one implicit reference to a further attribute value, which is retrievable from one of said attribute value sources, the processing means comprising:

a partial evaluation module configured to reduce the ABAC policy at least by substituting said one or more explicit attribute values for corresponding attributes appearing in the policy and by retrieving further attribute values, to which the access request and the policy make implicit reference, from the nearby attribute value source and substituting the further attribute values;

a first memory for caching references to further attributes to which the access request and the simplified policy make implicit reference and which are retrievable only from a remote attribute value source;

a second memory for caching the policy after substitutions as a simplified policy; and an evaluation module configured to retrieve attribute values from the at least one remote attribute value source based on the references cached in the first memory and to evaluate the simplified policy cached in the second memory by substituting the retrieved attribute values, wherein, for a given access request, the evaluation module is configured to retrieve the attribute values after the partial evaluation module has completed the reducing.

11. The processing means of claim 10, further comprising at least one attribute finder module for supplying the partial evaluation module with information whether an attribute appearing in the policy is retrievable from a remote attribute value source only.

12. The processing means of claim 10, further comprising at least one attribute finder module configured to:

receive a request from the partial evaluation means for an attribute value to be substituted for an attribute appearing in the policy; and returning the requested attribute value if this is retrievable from the nearby attribute value source.

13. The processing means of claim 10, further comprising at least one attribute finder module configured to:

receive a request from the partial evaluation means for an attribute value to be substituted for an attribute appearing in the policy; and returning an indication that the attribute is retrievable from a remote attribute value source only.

14. The processing means of claim 10, further comprising at least one attribute finder module configured to:

receive an indication from the evaluation module relating to one or more attribute values;

retrieve the requested attribute values according to the indication from the at least one remote attribute value source; and cache the retrieved attribute values and transmitting them on request to the evaluation module.

15. The processing means of claim 10, adapted to evaluate an ABAC policy for a multiple-resource access request, wherein the processing means further comprises a request preprocessing module for generating single access requests on the basis of a multiple-resource access request.

* * * * *